United States Patent Office 3,076,796
Patented Feb. 5, 1963

3,076,796
ETHYLENE POLYMERIZATION CATALYSTS
Wayne L. Carrick, Essex Fells, and Rudolph W. Kluiber, Newark, N.J., assignors to Union Carbide Corporation, a corporation of New York
No Drawing. Filed Apr. 11, 1958, Ser. No. 727,793
21 Claims. (Cl. 260—94.9)

This invention relates to a novel polymerization catalyst system which secures high yields of solid ethylene polymers of high molecular weight and narrow molecular weight distribution. More particularly, this invention relates to the use of a three component catalyst system using metal compounds yielding a completely hydrocarbon-soluble catalyst system for promoting a rapid polymerization of ethylene at relatively low reaction temperatures and pressures. More particularly, this invention relates to the production of normally solid ethylene polymers characterized by having a high degree of linearity of molecular chain structure and high molecular weight and narrow molecular weight distribution.

Many ways have been proposed for the polymerization of ethylene to normally solid polymers. Earliest of these techniques was the high pressure, high temperature polymerization which yielded polymers of relatively low density, i.e. 0.91 to 0.92 and having a melting temperature of about 105 to 115° C. Newer techniques more recently suggested have not been dependent upon the use of high temperatures and pressures but have instead employed novel catalyst systems for the production of polymers at ambient temperatures and low pressures. These polymers are generally characterized by having a density somewhat above that of the high pressure products and in addition generally have higher melting temperatures, e.g. about 125–135° C. Most of these newer processes have employed various metal compounds as the polymerization catalysts. Among these techniques have been those proposed by Prof. Karl Ziegler, which employ an aluminum trialkyl promoted by a reducible transition metal compound of the group IV–B, V–B and VI–B of the periodic system of elements as the polymerization catalyst. Most generally employed of these catalysts, commonly known as the Ziegler catalysts, have been the trialkyl aluminum compounds such as triisopropyl aluminum, triisobutyl aluminum and the like, with a titanium or vanadium tetrahalide. In addition to the higher density, the polymers produced by these catalysts have generally been characterized by a decreased resistance to impact shock than were the old type polyethylenes made by the high pressure polymerization techniques. Somewhat detrimentally these polyethylenes contain an extremely broad molecular weight distribution, and contain relatively large amounts of low molecular weight polyethylenes as well as significant amounts of extremely high molecular weight polymers.

The catalyst system employed in this polymerization technique did, however, permit the use of lower temperatures and pressures and significantly advance the science in securing polymers of higher crystallinity and higher density. Numerous problems have, however, developed from the use of such catalysts, principally among which is the insolubility of the catalysts per se. It has been recognized that the organo aluminum compound in the presence of a transition metal halide causes a reduction of the transition metal halide to a decreased valency with the creation of a free radical. In such a system, the reduction of the transition metal halide decreases its solubility to a point where it precipitates from the mixture and a hydrocarbon insoluble catalytic system is secured. Inasmuch as these catalysts must be used in a hydrocarbon solvent in order to be effective in promoting the polymerization of ethylene, the insoluble catalyst is then catalytically active only on its surface and presents further problems of separation from the polymer thus produced. While techniques are available to remove this insoluble catalyst from the polymer, such techniques are not only expensive but sometimes very difficult to secure a high purity polyethylene free of catalyst residues. In addition, the insolubility of the catalyst system secures only moderate polymerization rates and relatively low yields of polymer based on the weight of the catalyst employed.

It has more recently been proposed in copending application Serial No. 647,932, filed March 25, 1957, that a unique three component polymerization system can be employed which will correspondingly yield a hydrocarbon-soluble catalyst system and produce polymers not only in extremely high polymerization rates but also secure a polymer having a very high molecular weight and a narrow molecular weight distribution. In this system it was found that the three component catalytic composition using a hydrocarbon-soluble aluminum trihalide, an organo-metallic compound of the group II–B, IV–A and V–A, for instance tetra-butyl tin, diphenyl mercury, tetraphenyl tin, tetraethyl lead, triphenyl bismuth and the like and a vanadium compound which is soluble in an inert hydrocarbon liquid or a vanadium compound which forms a hydrocarbon-soluble vanadium compound by interaction with the aluminum trihalide would promote the polymerization of ethylene to a linear, high molecular weight polyethylene. This catalyst system is quite unique from that employing an aluminum trialkyl inasmuch as the catalyst system is made soluble and polymers produced thereby are somewhat unique in their physical properties distinguishing them over those made by the so-called Ziegler technique.

In this new polymerization technique several rather significant featuures were discovered. Firstly, it was found that the vanadium compound could be present in extremely small amounts. Generally amounts of .0005 to .05 mol per mol of aluminum halide gave extremely good results. Secondly, it was found that titanium, which is also a transition metal halide, was not effective in the catalyst system proving therefore that some unknown differences existed between the transition metal compounds and that for this polymerization, they were not equivalent.

In this improved catalytic system, much greater yields of polyethylene are secured per pound of catalyst, principally because of the solubility of the catalyst system. In addition, the average molecular weight of the polymer is usually greater than 65,000 and often as high as 125,000 as compared to a range of 5,000 to 15,000 for the Ziegler polymers. In adidtion the polymers have a narrow molecular weight distribution and low amounts of extractable waxes generally less than about 0.5 percent as compared to 2 to 6 percent for the Ziegler polymers. The polymers are also extremly linear, generally containing less than one methyl group for every 1000 carbon atoms, generally being the terminal groups of polymeric chains. On a weight basis, this means that these polymers contain no more than about 0.1 percent methyl groups by weight.

Because of the rather high relative cost of the organo-metallic compounds of the system, it was an object of the present invention that a less expensive material be found.

According to the present invention we have now found another hydrocarbon-soluble catalyst system which is effective for the polymerization of ethylene to secure a polymer of high average molecular weight and narrow molecular weight distribution. The catalyst system of the present invention comprises a combination of three components, each of which are critically necessary in the combination in order to secure the polymers.

One component of this polymerization system is a hydrocarbon-soluble aluminum trihalide, such as aluminum trichloride, aluminum tribromide and aluminum triiodide. The latter of these being somewhat less active catalytically than the first two. Aluminum trifluoride because of insolubility in hydrocarbons is generally ineffective. These aluminum trihalides are unique in this catalyst system and cannot be satisfactorily replaced by other Lewis acids.

A second component of this catalyst system is an organo aluminum dihalide having the formula R—Al—$X_2$ wherein R is a hydrocarbon group, and X is a halogen having an atomic weight greater than 35.0, i.e. chlorine, bromine and iodine, and preferably either chlorine or bromine. While it is possible for R to be any hydrocarbon group, i.e. aromatic, aliphatic or alicyclic, we prefer the lower alkyl hydrocarbon radicals such as methyl, ethyl, propyl, isopropyl, butyl, isobutyl and the like, and lower aromatic hydrocarbon groups, for instance phenyl, tolyl, biphenyl, naphthyl, and inert halogenated hydrocarbon groups. We particularly prefer phenyl aluminum dichloride and phenyl aluminum dibromide, and the lower alkyl aluminum dihalides.

It is desirable in this system that the R—Al—$X_2$ compound be substantially pure, and particularly being free of alkoxides, hydrides, and the like which tend to decrease the solubility of the system.

The third component of the catalyst of the present invention is a vanadium compound soluble in an inert hydrocarbon liquid which is or can be reduced to the lowest valence of vanadium, or a compound which forms a hydrocarbon-soluble vanadium compound by the interaction with the aluminum trihalide. Among such reducible, soluble compounds may be mentioned vanadium halides such as vanadium tetrachloride, vanadium tetrabromide, vanadium pentafluoride, vanadium oxytrichloride, vanadium tribromide and like compounds. Other compounds of vanadium which form hydrocarbon-soluble products on interaction with aluminum trihalides are exemplified by such vanadium halides as vanadium dichloride and vanadium dibromide, dicyclo-pentadienyl vanadium dichloride, and vanadium oxydichloride and vanadium oxides such as vanadium pentaoxide. It is, of course, recognized that other compounds of vanadium which are or can be reduced to a vanadium valence of +2, and which are or can be made soluble in inert hydrocarbons can be employed in this invention.

As with our invention in copending application Serial No. 647,932, vanadium is unique in this catalyst system. The use of metal salts such as titanium, tetrachloride when substituted for the vanadium compounds under the polymerization conditions of this invention will not yield solid ethylene polymers.

The surprising feature which we have now discovered is that the aluminum trihalide will solubilize the entire catalyst mixture and be effective in producing polymers of high molecular weight and narrow molecular weight distribution. For instance, it has been determined that within the limits of this invention, the presence only of the organo aluminum dihalide compound and the vanadium compound can produce a visibly insoluble mixture in a hydrocarbon solvent which shows the distinct Tyndall beam effect. The precipitate can be readily removed from the hydrocarbon solvent by centrifugation. However, the addition of the aluminum trihalide in amounts hereinafter specified can solubilize the resultant catalyst composition in the hydrocarbon solvent to give a true solution as evidenced by no Tyndall beam effect. Even ultraviolet absorption spectra of the solution shows distinct absorption bands with very little scattering. This solution, further, can be filtered through a bacteriological filter and can be centrifuged for hours without yielding a precipitate or recoverable solids when these catalyst components are present in a catalytically effective solution. Naturally it would be possible to add these components in amounts greater than their solubility limits. However, this is not intended nor is it desirable.

Without desiring to be bound to any particular theory, it is our belief that this extremely active catalyst for preparing ethylene polymers results from a reduction of the vanadium compound to the divalent state, its lowest valence. It has been established that under polymerization conditions with this catalyst system, the vanadium compound such as $VCl_4$ is reduced to the divalent state in a matter of minutes or less at 65° C., and no further reduction or change takes place even after four months although the catalyst system is still catalytically active. Only feeble catalytic activity is exhibited by $V^{+3}$ compounds under these conditions.

Further experiments to characterize the active species are very difficult because of the extreme complexity of the system. However, it has been determined that $VCl_2$ and $VBr_2$ by themselves do not promote the polymerization under the usual conditions, and are completely insoluble in cyclohexane, and most of the other solvents in which the catalyst composition is soluble. It was found however that aluminum trihalides cause the dissolution of the $VCl_2$ in the solvent but that the mixture exhibits no catalytic activity. This strongly suggests a complex formation between the aluminum halides and the vanadium compound. However, the electronegativity of the divalent state of vanadium (1.2 for $V^{+2}$ compared to 1.8 for $V^{+5}$) indicated that if bonded to carbon (electronegativity 2.2) the bond would be considerably ionic in character, so that of all the vanadium compounds, the divalent state would form the most stable organo-vanadium compounds. Furthermore, it was surmised that the ethylene polymer chain grows from the vanadium, and that the hydrocarbon group would probably be attached to the vanadium at the initiation. It was therefore expected that an organo-vanadium compound was formed. However, when the $VCl_4$ was added to a trialkyl aluminum compound in cyclohexane in an attempt to form an organo-vanadium compound, a heterogeneous insoluble system results.

However upon the discovery that the combination of the aluminum trihalide, the organo-aluminum dihalide and the vanadium compound surprisingly yields a soluble and very active catalytic system, it must therefore be concluded that a complex formation does take place. Apparently this complex involves the aluminum trihalide or the organo aluminum dihalide and the vanadium compound in the probable form of RVX where R is the organo group of the aluminum dihalide and X is a halogen. The most likely complex which we believe to be the active catalyst in the actual polymerization reaction is a complex having the structure

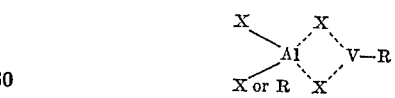

From our further studies, the ethylene polymer is believed to be formed by polar attraction of the monomer to the electropositive vanadium, followed by migration of the R group to one end of the polarized ethylene molecule. This reaction is subsequently repeated many times until long polymeric chains are formed.

We have found that with the catalyst systems of the present invention, the ethylene polymers secured thereby not only are higher in molecular weight but also are secured in a productivity based on the transition metal greatly improved over that of the insoluble Ziegler catalyst mixture of organo aluminum compound and transition metal compound. From experiments illustrating the process of the present invention, productivities within the range of 500,000 parts of polymer per part of vanadium are secured, whereas in the conventional triorgano aluminum transition metal halide process in the Ziegler technique secures a productivity of only 100 to 1000 parts of polymer per part of transition metal. This means that with the catalytic system of this invention, each vanadium atom can participate in the formation of about 1000 polymeric chains.

In addition, this process secures a highly linear ethylene homopolymer having a degree of branching less than one branch per 1000 carbon atoms and in most polymers will be less than one branch per 2000 carbon atoms. As determined by infra-red analysis at 7.25 micron wave length, the methyl content by weight is less than 0.2 percent and correspondingly decreases as the molecular weight of the polymer increases. Principally the methyl groups are terminal groups of the polymeric chains. In addition, these polymers have a low amount (e.g. less than 2%) of low molecular weight waxes as determined by extraction with boiling cyclohexane. Operating in the preferred ranges as hereinafter set forth, the ethylene homopolymers produced will generally have less than 1% of cyclohexane extractable waxes. The intrinsic viscosity of these polymers will generally be below 3.5 as determined in tetralin at 125° C., with the most desirable polymers being in the range of 1.0 to 2.5.

In general, the polyethylenes prepared by the catalysts of the present invention exhibit the narrow molecular weight distribution encountered in the polymers of application Serial No. 647,932. The polyethylenes of the present invention contain less than a total of 10 percent by weight of polymers having an intrinsic viscosity in tetralin between 0 and 0.4, and generally less than 5 percent by weight of high molecular weight polymers having an intrinsic viscosity in tetralin of over 3.1. The major portion of our polymers will be in the range of 1.0 to 2.5.

This distribution pattern has not been found in polyethylenes of similar high density prepared in the presence of previously known catalyst compositions effective for polymerizing ethylene. The high density type polyethylenes which have thus far been disclosed by others when similarly fractionated all show a considerable amount of relatively low molecular weight polymer, and gradually decreasing amounts of higher molecular weight polymers, including fractions of much higher molecular weight than are present in the polyethylenes of this invention.

Table I illustrates a typical fractional analysis of a polyethylene prepared in the presence of a Ziegler type catalyst, namely a mixture of an aluminum trialkyl and a titanium halide.

TABLE I

| Fraction | Wt. percent of Polymer | Intrinsic Viscosity |
|---|---|---|
| a | 38 | 0.4 |
| b | 20.5 | 0.8 |
| c | 11.5 | 1.2 |
| d | 6.0 | 1.6 |
| e | 5.5 | 2.4 |
| f | 3.5 | 2.8 |
| g | 3.5 | 3.2 |
| h | 2.5 | 4.0 |
| i | 1.5 | 4.4 |
| j | 1.5 | 4.8 |
| k | 1.0 | 5.2 |

Another catalyst system for polymerizing polyethylene is based on a reducible oxide of a metal of Group VI in association with an active or promoting catalyst support, this being sometimes referred to as the Philips Process, and is more particularly described in Belgium Patent 530,617. Table II sets forth the fractional analysis of a polyethylene prepared in the presence of such a catalyst system.

TABLE II

| Fraction | Wt. percent of Polymer | Intrinsic Viscosity |
|---|---|---|
| a | 21.5 | 0.4 |
| b | 20.5 | 0.8 |
| c | 13 | 1.2 |
| d | 8.5 | 1.6 |
| e | 7.5 | 2.0 |
| f | 8.5 | 2.4 |
| g | 6.5 | 2.8 |
| h | 4 | 3.2 |
| i | 3 | 3.6 |
| j | 2.5 | 4.0 |
| k | 2 | 4.4 |
| l | 1.5 | 4.8 |
| m | 1 | 5.2 |
| n | 0.5 | 5.6 |

The ethylene homopolymers prepared in the presence of the novel catalyst compositions herein described are useful for the production of molded articles, extruded films, and fibers and particularly for those applications requiring substantial resistance to heat, flexibility retention at low temperatures, and substantial stiffness.

As a consequence of the narrow molecular weight distribution of the polyethylenes of the present invention, these polymers are superior in many respects to those polymers produced by the Ziegler technique, particularly in their greater toughness and superior stress crack resistance. Under identical tests for environmental stress cracking at 50° C. In Igepal employing a modified Bell Laboratory Test, samples of Ziegler polyethylene lasted only 50 hours to 50 percent failure whereas our polyethylene did not reach 50 percent failure even after 500 hours. In this test samples which have been aged 7 days at 70° C. in an oven are slit and bent into a U shape at the slit and put in Igepal at 50° C. The time it takes for 50 percent failure of the samples is an indication of the degree of resistance to environmental stress cracking.

In the composition of the present invention it is necessary that the hydrocarbon-soluble vanadium compound be present only in minute amounts. Linear polyethylenes of the high molecular weight and narrow molecular distribution are secured by using molar concentrations from about 0.0001 to 0.05 mol of vanadium compound per mol of aluminum compounds. At higher vanadium concentrations than about 0.05 mol per mol of aluminum compounds, the resultant product has a broader molecular weight distribution and/or higher chain branching. Concentrations of vanadium less than about 0.0005 may be used but are much more susceptible to poisons.

It has also been found necessary to have at least 3 mols of the organo aluminum dihalide compound in the catalyst mixture per mol of soluble vanadium compound in order to initiate the reaction. In order to sustain the rapid polymerization rates, an excess of the organo aluminum dihalide should be used. If desired the organo aluminum dihalide can be added in increments during the polymerization in order to sustain the reaction. Generally, large amounts of the organo aluminum dihalide such as 1000 mols or more per mol of the vanadium compound serve to stabilize the catalyst mixture are not at all detrimental in this process, and quite often are desirable. The ratio of the amount of aluminum trihalide to the amount of the organo aluminum dihalide employed in this process is not narrowly critical but should be such as to render the catalyst system or at least a portion of it substantially soluble in the inert hydrocarbon solvent. Generally, amounts of at least 0.2 mol of the aluminum trihalide per mol of organo aluminum dihalide will effectively solubilize a substantial portion of the other two components in order to make the mixture catalytically active for practical polymerization rates. Preferably, we employ amounts of about 0.5 mols or more of the aluminum trihalide per mol of the organo aluminum dihalide compound. However, excessive amounts of the aluminum trihalide are not desirable and serve no useful purposes. The most desirable results secured with the catalyst system of the present invention are those wherein the ratio of aluminum trihalide to organo aluminum dihalide is from 1:1 to 3:1.

Inasmuch as these catalyst components are hygroscopic in nature, special care should be taken to exclude water from the reaction mixture. Likewise, exposure of the catalyst to air or oxygen should be avoided since this will seriously reduce polymer yield. After the catalyst components have been mixed with the hydrocarbon diluent, however, a small amount of oxygen in the reaction system can be beneficial. For example, when the catalyst compositions are used to polymerize ethylene in the presence of 50 to 3000 p.p.m. of oxygen, the polymer forms in much smaller particles than it does under similar conditions when only 0 to 25 p.p.m. of oxygen is present. The smaller particles are advantageous in some instances, particularly since the smaller particles are more effectively washed and treated to remove catalyst residues.

The polymerization of the present invention is conducted in the presence of an inert liquid serving as a solvent for the catalyst mixture and for the ethylene polymerization. The solvent should be a liquid at the normal reaction temperatures and pressures desired and should be a saturated aliphatic, alicyclic or aromatic hydrocarbon or inert halogenated derivatives. The amount of diluent present is not critical to obtain polymerization of the ethylene.

However, one very advantageous feature is the fact that higher concentration of catalyst components can be used while still securing the complete catalyst solubility in the solvent even up to .1 mol of the vanadium compound per liter of the solvent and aluminum compounds. This feature is particularly significant in that less solvent and catalyst need be employed in the polymerization technique because of the high activity of the catalyst system secured. Particularly good hydrocarbons suitable for this polymerization mixture are hexane, cyclohexane, heptane, isooctane, pentane, kerosene, methylcyclohexane and like saturated hydrocarbon solvents, although such other inert solvents as benzene, toluene, chlorobenzene bromobenzene, and the like can be employed. It is particularly desirable to purify the hydrocarbon solvent to remove impurities such as acetylene and highly polar components such as nitriles, oxygen-, sulfur-, and active hydrogen-containing compounds such as alcohol, water, amines, mercaptans and non-terminal olefinic unsaturated compounds such as cyclohexene, butene-2 and the like, which will react with the catalyst and serve to inactivate or poison the catalytic mixture.

The polymerization of ethylene using the catalyst compositions herein described can be readily conducted by contacting ethylene substantially free from acetylene, ketones, water, and other of those contaminants indicated above as being reactive with the catalyst, with a solution or dispersion of the catalyst composition in a suitable inert solvent as hereinbefore described, preferably maintaining the mixture at a temperature from about 10° C. to 150° C. and at pressures from subatmospheric to about 50 p.s.i.g., or above if desired. Inert gases, for instance nitrogen and argon, can be used in admixture with the ethylene to yield partial pressures of ethylene of less than one atmosphere. One method of reducing the polymer average molecular weight consists in using an ethylene partial pressure of less than one atmosphere. Higher pressures may be used if desired, but are ordinarily not required to obtain good yields of polymer. Generally the ethylene polymer forms as a precipitate of irregular size particles which can be filtered out of the hydrocarbon diluent. The filtered polymer particles can be washed with inert liquids which are non-solvents for the polymer or with suitable polar liquids such as water or alcohols, particularly ethanol and propanol, to remove catalyst residues. Washing with hydrocarbons is particularly desirable in this process because of the solubility of the catalyst composition. For practical convenience we prefer to operate the polymerization reaction at ambient temperatures, and generally from about room temperature to about 70° C.

In some instances the ethylene polymer as formed may go in solution in the hydrocarbon solvent because the polymerization temperature is high enough (usually when above 110° C.) to promote solubility. In such case, the cooling of the solution, as for example below about 80° C.–70° C. causes precipitation of the polymer.

The ethylene homopolymers prepared in the presence of this catalyst composition are all of relatively high molecular weight. As normally practiced, this invention usualy yields polyethylenes having a melt index of less than 10 measured at 190° C., although products having melt indices as high as 100 can be produced. The "melt index" test is determined according to ASTM test method D–1238–52T.

The melt index value of the polyethylene is dependent to some extent on the concentration of the catalyst in the hydrocarbon liquid. Polyethylenes having a melt index of less than 0.1 are normally obtained by polymerizing ethylene in the presence of less than 12 millimoles total catalyst composition per liter of hydrocarbon liquid. Higher catalyst concentrations yield products of higher melt index. The melt index of the polyethylene can also be increased by using reaction temperatures above 80° C., oxygen concentrations of greater than 500 p.p.m. in the ethylene feed, and other additives and chain terminators such as hydrogen chloride to the ethylene feed.

The productivity in terms of pounds of polymer per pound of catalyst is reduced when the catalyst concentration is increased beyond about 10 millimoles per liter of hydrocarbon solvent. The best efficiencies are obtained in the range of 0.75–3.0 millimoles of total catalyst per liter. Due to practical limitations resulting from the presence of impurities in the system, concentrations of catalyst below 0.50 millimole per liter are difficult to work with and the efficiency of the catalyst may thus be impaired by poisoning. In a system using more rigorously purified reagents, concentrations of catalyst lower than 0.50 millimole per liter can still be used with advantage.

It is particularly significant in the present discovery that these catalyst compositions are ineffective for the homopolymerization of olefins other than ethylene and no solid polymer is formed in similar polymerizations using propylene, butene-1, isobutylene and octene-1 as the sole polymerizing monomer. However, copolymers of ethylene and other higher olefins can be secured with this catalyst system, containing up to about 20 percent by weight of propylene or comparable molar amounts of the higher olefins. Therefore, as employed herein, the term ethylene polymers is meant to include not only the homopolymers of ethylene but copolymers of ethylene with up to about 15 mol percent of higher olefin hydrocarbons.

Physical properties of the ethylene homopolymers produced in accordance with the present invention are generally within the following ranges.

| | |
|---|---|
| Melt index | Below 0.2, generally less than 0.05. |
| Tensile modulus @ 1% elongation at 23° C. | 120,000 to 150,000. |
| Tensile modulus @ 1% elongation at 100° C. | 15,000 to 30,000. |
| Yield strength at 23° C. | 3,000 to 4,000 p.s.i. |
| Percent elongation at 23° C. | 30–250. |
| Tensile strength at 23° C. | 3,000 to 4,000 p.s.i. |
| Dielectric constant (50 mc.) at 23° C. | 2.2–2.4. |
| Brittle temperature (80% of samples under test exhibiting no failure) | Below −70° C. and generally less than −105° C. |

While these figures are set forth only as typical of most of the polyethylenes produced in accordance with the present invention, it will be recognized by those in this art that the changes of operating variables in the process can and often does significantly affect the physical properties of the polymer produced. Therefore we do not presume that these properties represent the most desirable or the ultimate for ethylene polymers prepared by our invention but are given for purposes of illustration only. It should be observed, however, that these average values are considerably higher than those secured by the Ziegler techniques using an aluminum alkyl-transition metal halide catalyst which is not soluble in the inert hydrocarbon.

The following examples will serve to illustrate our invention, although it is to be understood that the examples do not in any way limit the invention as otherwise described.

Example I

A 3 l. flask equipped with a mechanical stirrer, reflux condenser, and gas inlet tube was charged with 1 l. of cyclohexane. Dry nitrogen was bubbled through the diluent for 15 minutes to remove volatile contaminants and 20 m. moles methyl aluminum dichloride, 5 m. moles aluminum trichloride and 0.03 m. moles $VCl_4$ were added to the flask. The solution turned a faint pink color. Ethylene was then bubbled through the solution in the flask at atmospheric pressure and room temperature at a rates of 1 liter per minute (room temperature) and the heat of reaction increased the temperature to 50° C. and maintained at about this temperature for 60 minutes. At the end of one hour, the reaction was quenched by the addition of isopropanol even though the polymerization was still exothermic. The polymer was observed as a precipitate in the cyclohexane, and was washed with acetone and dried; yield 32 g., melt index 0.001 measured at 190° C. From this melt index it was estimated that the polymer had an average molecular weight of 100,000–125,000. The polymer contained about 1.0 percent waxes extractable with boiling cyclohexane. Infra red absorption spectra at 7.25 microns indicated substantially no methyl branching (less than 0.03 percent). Tensile modulus of the polymer was 131,000 p.s.i., tensile strength was 3,840 p.s.i. and percent elongation at break was 210%.

Example II

This experiment was carried out by the same procedure described in Example I using 1400 ml. of cyclohexane, 1.5 m. moles of phenyl aluminum dichloride, 1 m. mole of aluminum trichloride, and 0.025 m. mole of vanadium tetrachloride. Ethylene was sparged through the solution for one hour at a flow rate of 1 liter per minute at 60° C. After the hour, the reaction was quenched with isopropanol and the polymer was washed and dried. The yield of polymer was 14 grams. The polymer had a $10^P$ melt index of 0.07 determined by using 10 times the normal weight in the standard method of determining melt index by ASTM procedure D-1238-52T. Infra red spectra indicated a methyl content of less than 0.05 percent by weight.

Example III

A 250 ml. bottle was charged with 200 ml. of cyclohexane, 228 m. moles butyl aluminum dibromide, 58 m. moles aluminum tribromide and 20 m. moles vanadium tetrachloride. The vanadium tetrachloride was added in small increments and it was quickly reduced completely to the divalent state giving a clear pink solution and no precipitate. This clear pink solution is an active catalyst for the polymerization of ethylene.

(A) Two milliliters of the above solution was added to 300 ml. of heptane in the presence of an excess of ethylene at room temperature and atmospheric pressure. Rapid polymerization of the ethylene occurred and in five minutes the flask was filled with a gelatinous slurry of polymer; five grams of polyethylene were recovered having a melt index of 0.05.

(B) One drop of the active catalyst solution was added to a solution of 5 m. moles butyl aluminum dibromide and 2 m. moles aluminum tribromide in 1 liter of heptane at 70° C., and ethylene was sparged into the solution at 1 liter per minute for one hour. The reaction was quenched with isopropanol and the polymer was isolated and dried. Ten grams of polymer were secured having a melt index of 0.01. In this case the yield of polymer is roughly 20,000 grams of polymer per gram of vanadium halide.

Example IV

A sample of solid vanadium dichloride was heated in refluxing aluminum tribromide for one hour, cooled, and the slurry was diluted with cyclohexane to give a final solution containing 0.3 g. $AlBr_3$ per ml. of solution. Virtually all of the aluminum compounds dissolved in the cyclohexane, but only a small portion of the vanadium dichloride dissolved and the remainder was left as a precipitate on the bottom of the flask. This cyclohexane solution was red in color and contained 0.5 mg. of divalent vanadium per milliliter of solution (polarographic determination). Ten milliliters of the solution was then added to a solution of 15 m. moles of phenyl aluminum dibromide in 1 l. of cyclohexane. Ethylene was bubbled through this solution at 1 l./min. at 50° C. Polymerization started immediately and continued at a good rate with the temperature rising to 60° C. due to the exothermic reaction. The reaction was quenched with isopropanol after one hour while polymerization was still in progress. The yield of polymer was 35 grams having a melt index of 0.08.

Example V

A five liter flask equipped as in Example 1, and containing 2 liters of cyclohexane was charged with 18 m. moles of isobutyl aluminum dibromide and 4 m. moles of aluminum tribromide. Ethylene was bubbled through the mixture at a rate of 2 liters per minute. During the ethylene addition, increments of a solution of 1 m. mole of vanadium tetrachloride dissolved in 200 ml. of cyclohexane were gradually added over a one hour period. The temperature of the reaction mixture was at room temperature at the start of the addition of the ethylene and vanadium trichloride and at the end of the hour reaction, the temperature had increased to 60° C.

The polymer was filtered from the cyclohexane, washed and dried. The yield was 91 grams of a polymer having a melt index of 0.008.

We claim:

1. A process for polymerizing ethylene to a solid polymer which comprises contacting ethylene with a catalyst composition comprising as the principal essential catalytic components thereof, (a) a hydrocarbon-soluble aluminum trihalide, (b) an organo aluminum dihalide having the formula $R$—$Al$—$X_2$ wherein R is a hydrocarbon group and X is a halogen having an atomic weight above 35.0 and (c) a vanadium compound selected from the group of hydrocarbon-soluble vanadium halides, and the vanadium halides and vanadium oxides forming hydrocarbon-soluble vanadium compounds by interaction with the aluminum trihalide wherein at least a portion of the vanadium present has a valence of +2 and present in amounts of between about 0.0001 moles to 0.05 moles of vanadium per mole of aluminum compounds, said organo aluminum dihalide being present in an amount of at least three moles per mole of said vanadium compound and said aluminum trihalide is present in an amount of at least 0.2 mole per mole of organo aluminum dihalide.

2. A process according to claim 1 wherein the catalyst composition is contacted with ethylene in the presence of an inert liquid.

3. A process according to claim 1 wherein the vanadium compound is a reducible hydrocarbon-soluble vanadium compound containing halogen directly attached to the vanadium atom.

4. A process according to claim 1 wherein the organo aluminum dihalide has the formula RAlX$_2$ wherein R is a lower hydrocarbon group selected from the class of lower alkyl groups, lower aromatic hydrocarbon groups and inert halogenated hydrocarbon groups and X is a halogen selected from the group of chlorine and bromine.

5. A process according to claim 1 wherein the ethylene contains between 50 and 3000 p.p.m. of oxygen.

6. A process for producing solid polymers of ethylene which comprises contacting ethylene at a temperature be- about 10° C. and 150° C. in the presence of an inert organic liquid with a catalyst composition containing as the principal essential catalytic components, (a) a hydrocarbon-soluble aluminum trihalide, (b) an organo aluminum dihalide having the formula R—Al—X$_2$ wherein R is a hydrocarbon group and X is a halogen having an atomic weight above 35.0, and (c) a hydrocarbon-soluble vanadium halide wherein at least a portion of the vanadium has been reduced to a valence of +2 and being present in amounts of between 0.0001 and 0.05 mole of vanadium per mole of aluminum compounds, said organo aluminum dihalide being present in an amount of at least 3 moles per mole of said vanadium halide and the said aluminum trihalide being present in an amount of at least 0.5 mole per mole of organo aluminum dihalide and at least sufficient to solubilize a substantial portion of the vanadium halide in the inert organic liquid.

7. A process according to claim 6 wherein the organo aluminum dihalide has the formula RAlX$_2$ wherein R is a lower hydrocarbon group selected from the class of lower alkyl groups, lower aromatic hydrocarbon groups and inert halogenated hydrocarbon groups and X is a halogen selected from the class of chlorine and bromine.

8. A process according to claim 7 wherein the vanadium halide is a vanadium tetrahalide.

9. A process according to claim 6 wherein the organo aluminum dihalide is phenyl aluminum dichloride.

10. A process according to claim 6 wherein the organo aluminum dihalide is phenyl aluminum dibromide.

11. A hydrocarbon-soluble catalyst composition effective for the polymerization of ethylene to normally solid polymers, comprising as the principal essential catalytic components (a) a hydrocarbon-soluble aluminum trihalide, (b) an organo aluminum dihalide having the formula R—Al—X$_2$ wherein R is a hydrocarbon group and X is a halogen having an atomic weight above 35.0, and (c) a vanadium compound selected from the group of hydrocarbon-soluble vanadium halides, and the vanadium halides and vanadium oxides forming hydrocarbon-soluble vanadium compounds by interaction with the aluminum trihalide and wherein at least a portion of the vanadium has a valence of +2 and which is present in an amount of between about 0.0001 mole to 0.05 mole of vanadium per mole of aluminum compounds present, said organo aluminum dihalide being present in an amount of at least three moles per mole of said vanadium compound and said aluminum trihalide is present in an amount of at least 0.2 mole per mole of said organo aluminum dihalide and at least sufficient to solubilize a substantial portion of the said vanadium compound in an inert organic hydrocarbon liquid.

12. A catalyst composition as described in claim 11 wherein the organo aluminum dihalide has the formula RAlX$_2$ wherein R is a lower hydrocarbon group selected from the class of lower alkyl groups, lower aromatic hydrocarbon groups and inert halogenated hydrocarbon groups and X is a halogen selected from the class consisting of chlorine and bromine.

13. A catalyst composition as described in claim 11 wherein the organo aluminum dihalide is phenyl aluminum dichloride.

14. A catalyst composition as described in claim 11 wherein the organo aluminum dihalide is phenyl aluminum dibromide.

15. A catalyst composition as described in claim 11 wherein the vanadium compound is a reducible hydrocarbon soluble vanadium compound containing halogen directly bonded to the vanadium atom.

16. A catalyst composition as described in claim 11 wherein the vanadium compound is vanadium tetrachloride.

17. A catalyst composition suitable for the polymerization of ethylene into a normally solid polymer which comprises a mixture of a hydrocarbon soluble aluminum trihalide, an organo aluminum dihalide having the formula R—Al—X$_2$ wherein R is a hydrocarbon group and X is a halogen having an atomic weight above 35.0 and a vanadium halide wherein the vanadium has a valence of +2 and the halide is present in an amount of between 0.0001 and 0.05 mole per mole of said aluminum trihalide, and the said organo aluminum dihalide is present in an amount of at least three moles per mole of said vanadium halide and between one-third and 1 mole per mole of aluminum trihalide.

18. A process for the polymerization of a normally solid polymer of ethylene which comprises contacting an ethylene containing gas with a catalyst composition in the presence of an inert organic hydrocarbon liquid, said catalyst composition containing as the principal essential catalytic components (a) a hydrocarbon-soluble aluminum trihalide selected from the group of aluminum trichloride and aluminum tribromide, (b) an organo aluminum dihalide having the formula R'—Al—X'$_2$ wherein R' is a lower alkyl group and X' is a halogen selected from the group of chlorine and bromine, and (c) a vanadium compound selected from the group of hydrocarbon-soluble vanadium halides, and the vanadium halides and vanadium oxides forming hydrocarbon-soluble vanadium compounds by interaction with the aluminum trihalide, and wherein the vanadium compound has a valence of +2 and is present in an amount of between 0.0001 and 0.05 mole per mole of aluminum compounds present, and wherein the organo aluminum dihalide is present in an amount of at least three moles per mole of the vanadium compound, and wherein the said aluminum trihalide is present in an amount of from one to three moles per mole of organo aluminum dihalide.

19. A process according to claim 18 wherein the ethylene contains between 50 and 3000 p.p.m. of oxygen.

20. A liquid catalyst composition effective for polymerization of ethylene comprising an inert organic liquid having dissolved therein as the principal essential catalytic components thereof (a) a hydrocarbon-soluble aluminum trihalide, (b) an organo aluminum dihalide having the formula R—Al—X$_2$ wherein R is a hydrocarbon group and X is a halogen having an atomic weight above 35.0, and (c) a vanadium compound selected from the group of hydrocarbon-soluble vanadium halides and the vanadium halides and vanadium oxides forming hydrocarbon-soluble vanadium compounds by interaction with the aluminum trihalide, and wherein a portion of the vanadium has a valence of +2 and wherein the vanadium is present in amounts of between 0.0001 mole and 0.05 mole of vanadium per mole of aluminum compounds, said organo aluminum dihalide being present in an amount of at least three moles per mole of said vanadium compound and the said aluminum trihalide being present in an amount of at least 0.5 mole per mole of organo aluminum dihalide and at least sufficient to solubilize a substantial portion of the vanadium compound present in the said composition.

21. A liquid catalyst composition effective for polymerization of ethylene to normally solid polymers comprising an inert organic hydrocarbon liquid having dissolved therein as the principal essential catalytic components thereof, (a) a hydrocarbon-soluble aluminum trihalide selected from the group of aluminum trichloride and aluminum tribromide, (b) an organo aluminum dihalide having the formula R'—Al—X'$_2$ wherein R' is a lower alkyl group and X' is a halogen selected from the group of chlorine and bromine, and (c) a hydrocarbon-soluble vanadium halide and wherein the vanadium has a valence of +2 and said compound is present in an amount of between 0.0001 and 0.05 mole per mole of aluminum compounds present and wherein the said organo aluminum dihalide is present in an amount of at least three moles per mole of the vanadium halide and wherein the said aluminum trihalide is present in an amount of from one to three moles per mole of organo aluminum dihalide.

References Cited in the file of this patent

UNITED STATES PATENTS

| | | |
|---|---|---|
| 2,786,036 | Freimiller et al. | Mar. 19, 1957 |
| 2,822,357 | Brebner et al. | Feb. 4, 1958 |
| 2,824,145 | McCall et al. | Feb. 18, 1958 |
| 2,827,446 | Breslow | Mar. 18, 1958 |
| 2,846,427 | Findlay | Aug. 5, 1958 |
| 2,900,374 | Aries | Aug. 18, 1959 |

FOREIGN PATENTS

| | | |
|---|---|---|
| 785,314 | Great Britain | Oct. 23, 1957 |